March 30, 1943.  J. P. MAYNARD ET AL  2,314,945
MACHINE FOR SHARPENING LAWN-MOWERS
Filed June 1, 1940  3 Sheets-Sheet 1
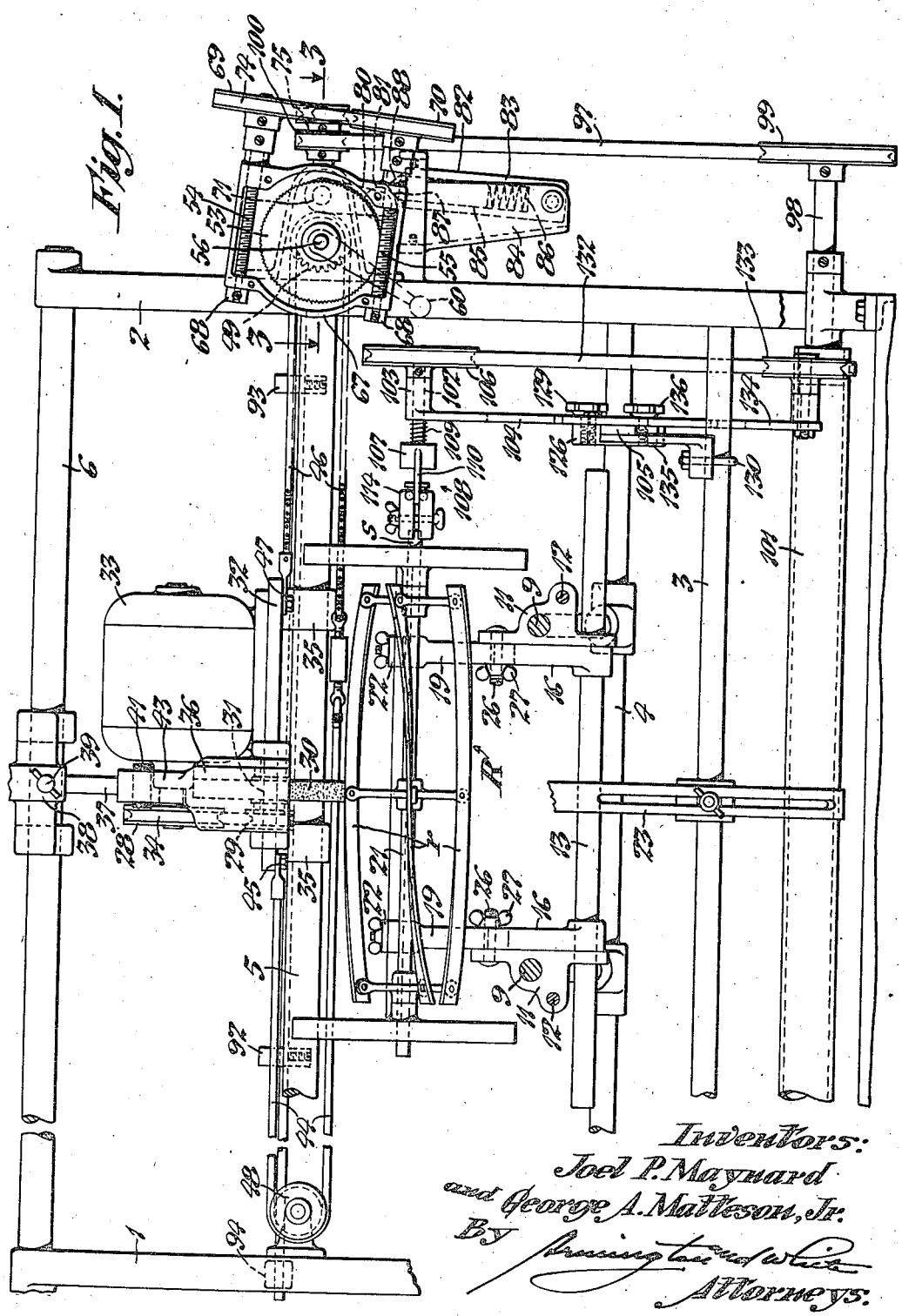
Inventors:
Joel P. Maynard
and George A. Matteson, Jr.
By
Attorneys.

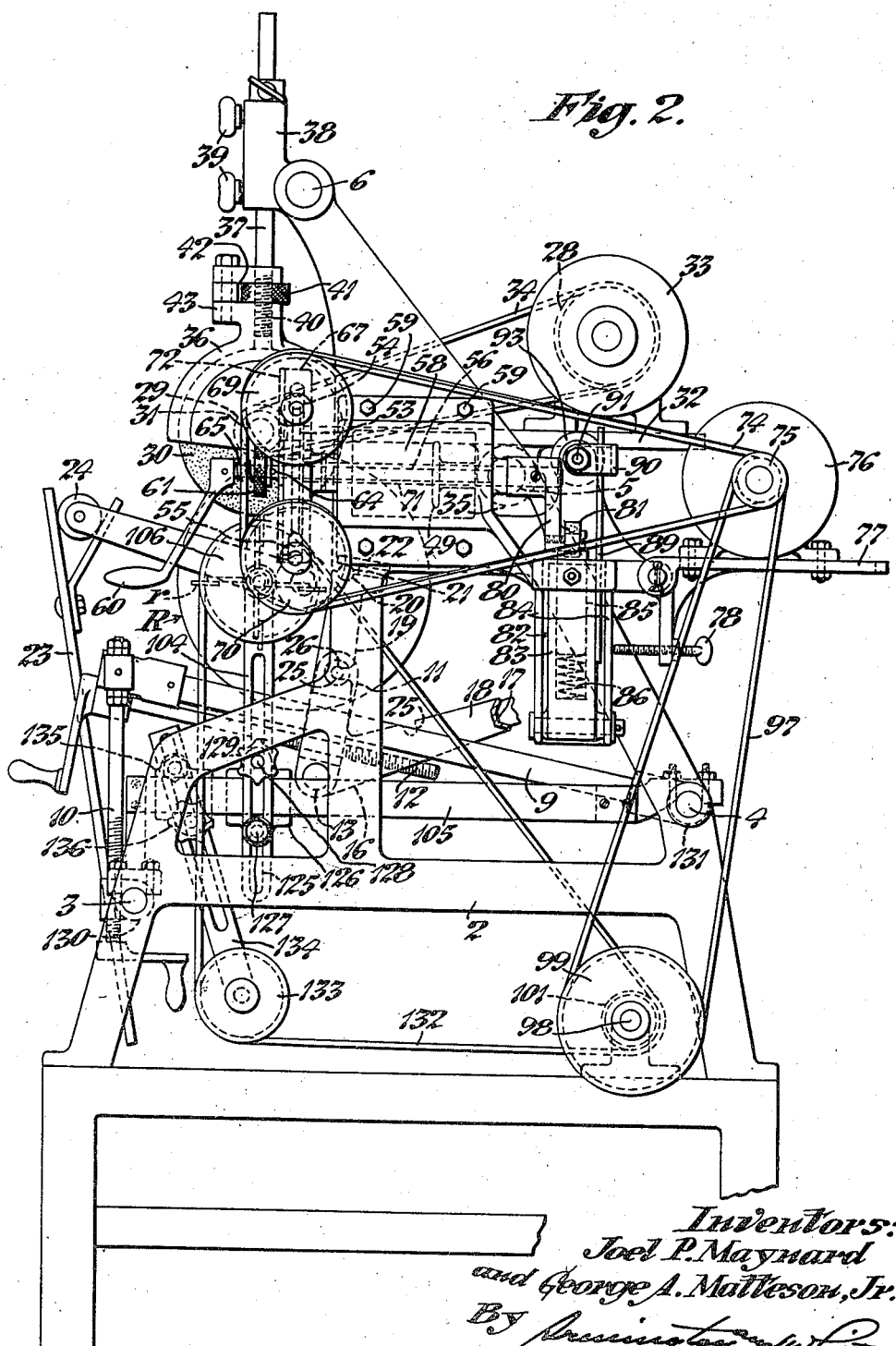

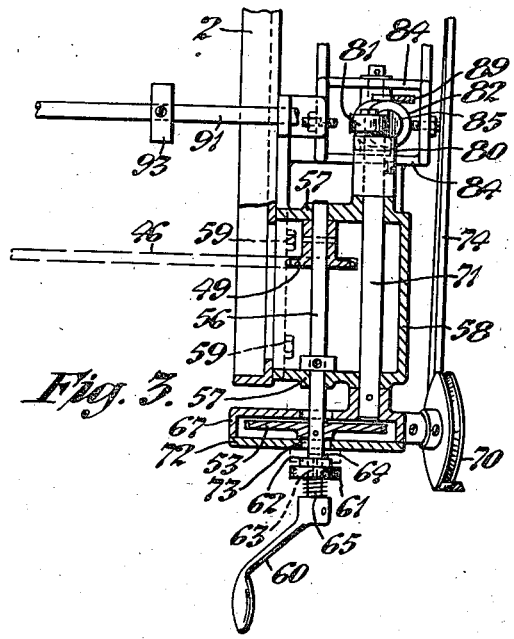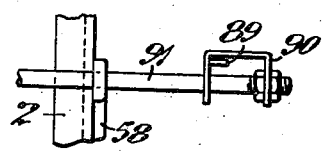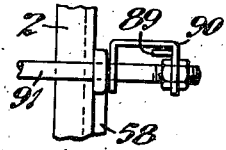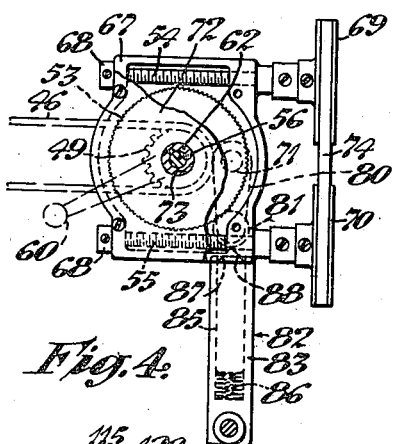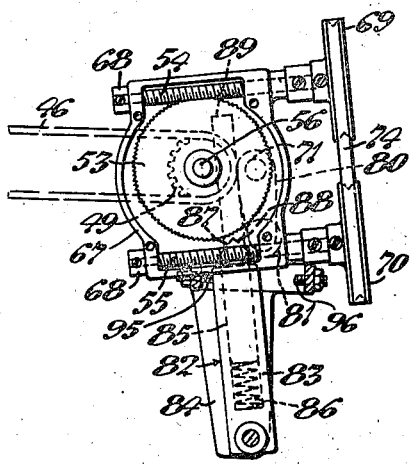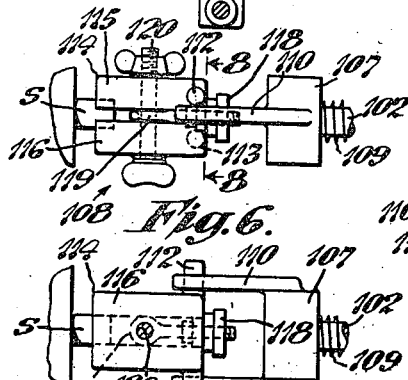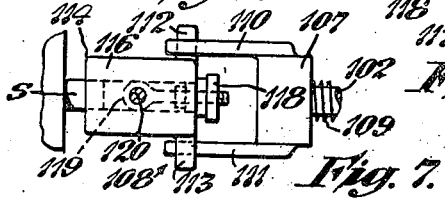

Patented Mar. 30, 1943

2,314,945

UNITED STATES PATENT OFFICE 2,314,945

MACHINE FOR SHARPENING LAWN MOWERS

Joel P. Maynard, Pawtucket, and George A. Matteson, Jr., Saunderstown, R. I., assignors to The Graham Mfg. Co., Inc., a corporation of Rhode Island Application June 1, 1940, Serial No. 338,348

1 Claim. (Cl. 51—48)

This invention relates to lawn-mower grinding machines and more particularly to improvements in machines of the type illustrated and described in United States Letters Patent to Purdom Carpenter, No. 2,142,669, issued January 3, 1939.

One of the objects of the present invention is to provide a machine of the type indicated wherein a lawn-mower reel is rotated and the reel and grinding tool relatively traversed to produce cylindrical surface grinding.

Another object of the invention is to provide a machine of the type indicated having an improved reversing mechanism for automatically reversing the direction of relative traverse of the reel and grinding tool.

Another object of the invention is to provide a machine of the type indicated having an improved driving means for rotating the lawn-mower reel.

Another object of the invention is to provide a traverse-reversing mechanism and driving means for rotating the lawn-mower reel adapted to be mounted on machines of usual construction as an attachment and driven by a common driving element.

Still another object of the invention is to provide an attachment for a machine of the type indicated which is of relatively simple construction while at the same time efficient in performing its intended functions.

Further objects of the invention are set forth in the following specification which describes a preferred form of construction of the machine, by way of example, as illustrated by the accompanying drawings. In the drawings:

Fig. 1 is a front elevational view of a lawn-mower grinding machine showing the reversing mechanism for operating the traversing means and the means for rotating the lawn-mower reel;

Fig. 2 is an end elevational view showing the single motor for driving the reversing mechanism for the traversing means and the means for rotating the lawn-mower reel;

Fig. 3 is a plan view partly in section on line 3—3 of Fig. 1;

Fig. 4 is a front elevational view of the reversing mechanism shown in neutral position to adapt the traversing mechanism to be operated manually;

Fig. 5 is a view similar to Fig. 4 showing the reversing mechanism in a position of adjustment opposite from that illustrated in Fig. 1;

Fig. 6 is an enlarged view of the clutch for coupling the lawn-mower reel to its driving means;

Fig. 7 is a view similar to Fig. 6 showing the clutch as turned 90° from the position illustrated in Fig. 6;

Fig. 8 is a transverse sectional view taken on line 8—8 of Fig. 6 and showing the interlocking arms on the driving head and dog of the clutch to provide a flexible driving connection;

Fig. 9 is a plan view showing the push rod for operating the reversing mechanism in one of its extreme positions; and Fig. 10 is a view similar to Fig. 9 showing the push rod as moved to its opposite extreme position to operate the reversing mechanism.

The present invention relates, in general, to a lawn-mower grinding machine having automatically operated mechanism for reversing the direction of relative traverse of the grinding tool and lawn-mower reel to be ground and means for continuously rotating the reel to produce cylindrical surface grinding. The reversing mechanism comprises a worm-wheel mounted on a driven shaft for operating the traversing mechanism and a movable frame in which a pair of continuously rotating worm-gears or the like are journaled. The worm-gears are positioned adjacent the periphery of a worm-wheel at opposite sides thereof and a cam actuated by the relatively traversing tool and reel operates the movable frame to simultaneously engage one of the worm-gears with the worm-wheel and disengage the other worm-gear therefrom to reverse the direction of traverse. The means for driving the lawn-mower reel is adjustable on the machine frame to adapt it for connection to reels of different size and the arrangement of the parts is such that the reversing mechanism and driving means for rotating the lawn-mower reel are driven from a common driving element.

Referring to the drawings, the machine incorporating the novel features of the present invention is generally similar to that shown and described in the United States Letters Patent to Purdom Carpenter referred to above. Suffice it to state herein that the machine comprises a frame having end-standards 1 and 2 held in spaced relationship by tie-rods 3, 4, 5 and 6 connected at their ends to the standards. Extending transversely of the machine in spaced apart relationship are supporting rods 9 which are pivotally connected to the tie-rod 4 at their rearward ends and to jack-screws 10 at their forward ends. The jack-screws 10 are so constructed and arranged as to adapt the forward ends of the rods 9 to be raised or lowered when the screws are turned. Mounted on the rods 9 are blocks 11 adapted to be moved forwardly and rearwardly longitudinally thereof by means of adjusting screws 12. The blocks 11 support a shaft 13 extending transversely of the rods 9 and mounted to rock on the shaft is a supporting cradle as described hereinafter.

The cradle comprises elbow-shaped members 16 pivotally mounted in spaced relationship on the shaft 13 and a transverse angle-iron rail or bed 17 connecting the ends of the arms 18 of the members 16. The arms 18 of the members 16 are adapted to detachably mount the stationary blade of a lawn-mower while the opposite arms 19 are adapted to support the reel R of a lawn-mower to be ground. The arms 19 have notches 20 at their upper ends for receiving the tie-rod 21 of the lawn-mower frame with clamps 22 for clamping the tie-rod in the notches, see Figs. 1 and 2. An adjustable bracket 23 extending upwardly from the machine frame tie-rod 3 is adapted to support the roller 24 of the lawn-mower to locate the blades r of the reel R in position to be ground. The cradle is rockable from one to the other of two positions and as illustrated in Fig. 2 the arms 18 and 19 have notches 25 for receiving the shanks of bolts 26, see Fig. 1, projecting laterally from the blocks 11 on the rods 9, wing-nuts 27 being screwed onto the bolts 26 and tightened against the arms 18 and 19 to clamp the cradle in one or the other of its two positions on the frame. It will be understood that other structures may be provided for supporting the stationary blade and reel R, either mounted in or detached from the mower, in position to be traversed by the grinding-wheel.

The grinding means comprises an abrasive wheel 30 adapted to traverse the stationary blade or blades r of the reel R to be ground. The grinding-wheel 30 is mounted for rotation on a shaft 31 at one side of a carriage 32 and is driven from an electric motor 33 on the carriage by a belt 34 connecting suitable pulleys 28 and 29. The carriage 32 has depending bearings 35 which embrace the tie-rod 5 to mount the carriage to rock and slide thereon. Thus, the tie-rod 5 constitutes a track for guiding and supporting the carriage 32. The grinding-wheel 30 and motor 33 are preferably arranged on the carriage 32 on opposite sides of the track 5 to substantially counterbalance each other with a slight overbalance on the wheel side. The rocking movement of the carriage 32 on its supporting track 5 is controlled by an adjustable linkage connecting the carriage to the frame tie-rod 6, which latter also constitutes a guiding track therefor. The linkage comprises a guard 36 for the wheel 30 attached to the shaft 31 and an adjustable rod 37 connecting the guard to a bearing 38 slidable on the guiding track 6. As illustrated in Fig. 2 the upper end of the rod 37 is clamped in the bearing 38 by means of thumb-screws 39 to permit its vertical adjustment and the lower end of the rod has screw-threads 40 which cooperate with the threaded bore of a nut 41 closely fitting between the sides of a slot 42 in a bearing 43 surmounting the guard 36. Thus, the linkage provides a rigid connection between the carriage 32 and the bearing 38 on the guiding track 6. The bearing 38 has spaced hubs embracing the guiding track 6 and is adapted to slide thereon as the carriage is moved along its supporting track 5.

The carriage 32 is traversed longitudinally of the machine by means of flexible driving means, see Fig. 1, comprising a cable section 44 having one end attached to the carriage at 45 and a chain section 46 having one end connected to the cable section and its opposite end attached to the carriage at 47. The cable section 44 passes around a pulley 48 suitably mounted on the standard 1 of the frame, while the chain section passes around a sprocket 49 of a driving and reversing mechanism for the traversing means as next explained.

In accordance with the present invention, a novel form of driving and reversing mechanism for the traversing means is provided comprising a driven wheel 53 and a pair of driving elements 54 and 55 at opposite sides of the driven wheel and alternately engageable therewith. The driven wheel 53 is illustrated in the form of a worm-wheel mounted on the forwardly projecting end of a shaft 56 journaled in suitable spaced bearings 57 in a bracket 58, see Figs. 1 and 3. The bracket 58 is attached to the outside of the standard 2 of the machine frame by means of bolts 59 to adapt the driving and reversing mechanism of the present invention to be mounted on standard machines as an attachment therefor. The shaft 56 mounts the sprocket 49, previously referred to, between the bearings 57. A crank-handle 60 may be mounted on the forward end of the shaft 56 for turning the latter manually and between the hub of the crank-handle and the forward bearing 57 of the bracket 58 is a sleeve 61 having a reduced rearwardly extending end portion 62 with a slot 63 therein as shown in Fig. 3. The sleeve 61 is normally held in its forward position illustrated in Figs. 2 and 3 by the engagement of its reduced end portion 62 with a pin 64 projecting radially from the shaft 56. The sleeve 61 is slid rearwardly on the shaft 56 when the slot 63 therein is alined with the pin 64 by means of a coil-spring 65 acting between the rearward end of the hub of the crank-handle 60 and the forward end of the sleeve 61.

The driving elements 54 and 55, herein illustrated as shafts with screw-threads or helical worm-teeth formed thereon, are journaled in a movable frame or casing 67 embracing the worm-wheel 53 and are positioned at opposite sides of the latter. As illustrated most clearly in Fig. 1, the worm-gears 54 and 55 are held against axial movement in the casing 67 by collars 68 fastened to their reduced end portions with their opposite end portions projecting from the casing and carrying pulleys 69 and 70 fixed thereto. The casing 67 has a removable front cover-plate 72 provided with a centrally located circular hole 73 therein through which the shaft 56 extends, see Fig. 3. The hole 73 in the cover-plate 72 is of sufficient diameter to adapt the casing 67 to rock from one to the other of its two positions illustrated in Figs. 1 and 5 and is of substantially the same diameter as the reduced end portion 62 projecting from the sleeve 61. When the reduced end portion 62 of the sleeve 61 is projected rearwardly into the hole 73 in the cover-plate 72 of the casing 67 it maintains the latter in its neutral position illustrated in Fig. 4, at which time the worm-gears 54 and 55 are both disengaged from the worm-wheel 53. The threads on the worm-gears 54 and 55 advance in the same direction and the worm-gears are continuously rotated by a belt 74 extending around the pulleys 69 and 70 on the worm-gears and a pulley 75 on the drive shaft of an electric motor 76, see Fig. 2. The motor 76 is mounted on a platform 77 projecting rearwardly from the bracket 58 and for purposes of adjustment the platform is pivotally connected to the bracket and rendered adjustable by means of a set-screw 78.

Although the casing 67 may be adapted for movement in any suitable manner, as herein illustrated it is mounted on the forward end of a rock-shaft 71 journaled in suitable bearings in the bracket 58 and spaced laterally from the shaft 56. Depending from the rearwardly projecting end of the rock-shaft 71 is an actuating arm 80 having a follower or roller 81 at its end. The casing 67 is rocked from one to the other of its two positions illustrated in Figs. 1 and 5 by means of an over-center cam 82 cooperating with the roller 81 on the actuating arm 80. As herein illustrated the over-center cam is in the form of a hollow arm 83 pivotally mounted at its lower end between spaced arms 84 depending from the bracket 58. A plunger 85 in the hollow arm 83 is normally urged outwardly with respect thereto by a spring 86 and the upper end of the plunger has oppositely inclined cam faces 87 and 88 engageable with the roller 81 on the actuating arm 80. Thus, when the over-center cam 82 is rocked from the position illustrated in Fig. 1 to that illustrated in Fig. 5 the engagement of the inclined cam-face 87 with the roller 81 causes the plunger 85 to slide into the hollow arm 83 as the peak of the cam passes across the axis of the roller. After the peak of the cam 82 has passed across the axis of the roller 81 the opposite inclined face 88 acting on the roller will rock the actuating arm 80 and rock-shaft 71 connected thereto which, in turn, rocks the casing 67 to disengage the worm-gear 55 from the worm-wheel 53 and engage the worm-gear 54 therewith. The extent of rocking movement of the over-center cam 82 is limited by the engagement of its hollow arm 83 with adjustable stops 95 and 96 on the bracket 58, see Fig. 5, to maintain one or the other of the cam-faces 87 or 88 in engagement with the follower or roller 81.

To provide for automatic operation of the reversing mechanism a lever 89 attached to the side of the hollow arm 83 projects upwardly through a looped strap 90 on a push rod 91. The push rod 91 is mounted for sliding movement through the web of the bracket 58 attached to the standard 2 and a bracket 94 attached to the standard 1, see Fig. 1, and has adjustable stops 92 and 93 fixed thereon in position to be engaged by the carriage 32 during its traverse on the track 5 of the machine frame. Thus, as the carriage 32 moves to the left as viewed in Fig. 1 it engages the stop 92 on the push rod 91 to slide the latter to the left as viewed in Fig. 10 causing the looped strap 90 at its right-hand end to actuate the lever 89 to rock the over-center cam 82 to the position illustrated in Fig. 5.

In accordance with the present invention driving mechanism is provided for rotating the lawn-mover reel R during the relative transverse of the reel and grinding tool 30 whereby to produce a cylindrically ground surface. To this end a countershaft 98 is journaled in bearings at the bottom of the standards 1 and 2 of the machine frame and has one end projecting beyond the standard 2 with a pulley 99 fast thereon in alinement with a pulley 100 on the drive shaft of the motor 76, the two pulleys being drivingly connected by a belt 97. On the countershaft 98 between the standards 1 and 2 is a roller which in effect constitutes an elongate pulley 101. A drive shaft 102 adapted for alinement with the shaft of the lawn-mower reel R is journaled in a bearing 103 on an arm 104 adjustably mounted on a cross-strut 105 extending between the tie-rods 3 and 4 of the machine frame. The shaft 102 mounts a pulley 106 at one side of the gearing 103 and has a yoke-shaped driving head 107 at the opposite side of the bearing comprising one of the elements of a flexible coupling 108, shown in detail in Figs. 6 to 8. The shaft 102 is slidable in the bearing 103 and is normally held in the position illustrated in Fig. 1 by means of a spring 109 acting between the bearing and the driving-head 107.

The spaced arms 110 and 111 of the yoke-shaped driving head 107 are adapted for driving engagement with the radially extending arms 112 and 113 of a dog 114 detachably clamped to the shaft s of the lawn-mower reel R and comprising the other element of the flexible coupling 108, see Figs. 6 and 7. The dog 114 consists of complementary jaws 115 and 116 having angular grooves 117 to adapt them at one end to fit the shafts of lawn-mower reels R of different dimensions. A plug 118 having a series of stepped shoulders is adapted for insertion into the opposite end of the dog 114 between the jaws 115 and 116 to provide a filler element of substantially the same diameter as the shaft s of the lawn-mower reel R. The plug 118 is held in place by an eye-bolt 119 extending axially of the dog 114 between the jaws 115 and 116 and the latter are clamped to the shaft of the lawn-mower reel R by a bolt 120 extending diametrically through the jaws and through the eye of the bolt 119 of the plug 118.

The arm 104 mounting the shaft 102 is provided with a longitudinally extending slot 125 for adjustably connecting it to the cross-strut 105 by means of a clamp 126 embracing the cross-strut and having a bolt 127 and threaded stud 128 projecting through the slot in the arm. The clamp 126 is slidable on the cross-strut 105 to adjust the shaft 102 laterally of the machine and the arm 104 is slidable vertically with respect to the clamp 126 to adjust the height of the shaft, the arm being clamped in adjusted position by means of a finger nut 129 screwed onto the threaded stud 128 and tightened against the arm. The cross-strut 105 is also slidable laterally along the tie-rods 3 and 4 on which it is mounted to adjust the shaft 102 longitudinally of the machine, the cross-strut being held in adjusted position by clamps 130 and 131 embracing the tie-rods. Thus, the relative position of the shaft 102 may be adjusted to approximate alinement with the shaft s of the lawn-mower reel R and the flexible coupling 108 will compensate for any slight misalinement.

The shaft 102 is driven by a belt 132 extending around the pulley 106 thereon, the pulley 101 on the countershaft 98 and an idler pulley 133 mounted on an arm 134 adjustably mounted on the cross-strut 105. The arm 134 is connected to the cross-strut 105 by means of a clamp 135 and nut 136 similar to the clamp 126 and nut 129 described previously. A preferred embodiment of the invention having now been described in detail the method of operation of the machine is explained as follows:

The dog 114 of the flexible clutch 108 is first clamped to the end of the shaft s of the lawn-mower reel R to be ground. To this end the clamping bolt 120 is loosened to adapt the jaws 115 and 116 of the dog 114 to receive the end of the shaft s and the stepped shoulder on the plug 118 most nearly approaching the diameter of said shaft is inserted between the jaws of the dog at its opposite end. The clamping bolt 120 is then tightened to clamp the dog 114 to the shaft. The reel is then mounted in the machine on the arms 19 of the cradle and bracket 23. The arm 104 is adjusted vertically and horizontally on the cross-strut 105 to aline the shaft 102 with the shaft s of the reel R and the cross-strut is adjusted along the tie-rods 3 and 4 to bring the arms 110 and 111 of the yoke-shaped driving head 107 into position to engage the radially projecting arms 112 and 113 of the dog 114. The arm 134 is then adjusted on the cross-strut 105 to position the idler pulley 133 to tighten the driving belt 132. The abrasive wheel 130 is also roughly adjusted by loosening the thumb-screws 39 and moving the adjustable rod 37 with respect to the bearing 38 and the position of the wheel is then accurately adjusted by turning the nut 41 on the screw-threaded portion 40 of the rod. The machine is now ready for a grinding operation.

With the reversing mechanism in its position of adjustment illustrated in Fig. 1 the driving motor 76 operating through the belt 74 and pulleys 69 and 70 will rotate the worm-gear 55 and worm-wheel 53 in mesh therewith to rotate the shaft 56 in counterclockwise direction. The sprocket 49 on the shaft 56, meshing with the links of the chain section 46 of the flexible driving means will thus cause the carriage 32 carrying the abrasive wheel 30 to be traversed toward the left as viewed in Fig. 1. Simultaneously, with the traversing movement of the carriage 32 the lawn-mower reel R is rotated by the drive comprising the flexible coupling 108, shaft 102, belt 132, countershaft 98, belt 97 and electric motor 76. When the carriage 32 reaches nearly the limit of its traverse to the left it will engage the stop 92 on the push rod 91, see Fig. 1, and slide the latter to the left as viewed in Fig. 10.

Movement of the push rod to the left causes the looped strap 90 thereon to actuate the lever 89 to rock the over-center cam 82 to the position illustrated in Fig. 5. During the rocking movement of the over-center cam 82 the spring pressed plunger 85 is pressed into the hollow arm 83 against the action of the spring 86 until the peak of the cam passes over the center of the follower roller 81, after which the cam-face 88 acting on the follower roller rocks the actuating arm 80, rock-shaft 71 and casing 67 connected thereto to the position illustrated in Fig. 5. Thus, the worm-gear 55 is disengaged from the worm-wheel 53 and the worm-gear 54 is engaged immediately therewith. Due to the rotation of the worm-gears 54 and 55 in the same direction and their relative position at opposite sides of the worm-wheel 53 the direction of rotation of the latter will be reversed. The direction of rotation of the sprocket 49 will also be reversed causing the carriage 32 to move to the right as viewed in Fig. 1.

The carriage 32 continues to move toward the right until it engages the stop 93 to actuate the push-rod 91 to the right as illustrated in Fig. 9. The over-center cam 82 is then rocked back to the position illustrated in Fig. 1, thereby causing the rock-shaft 71 and casing 67 to be rocked to disengage the worm-gear 54 from the worm-gear 53 and engage the worm-gear 55 therewith. Thus, the reversing mechanism for the traversing means is automatically operated to reverse the direction of traverse and the lawn-mower reel R is continuously rotated to produce cylindrical ground surfaces on the blades r.

If it is desired to operate the traversing means manually the sleeve 61 on the shaft 56 is turned to aline the slot 63 therein with the pin 64 on the shaft. The spring 65 will then slide the sleeve 61 to project its reduced end portion 62 into the circular hole 73 in the cover-plate 72 of the casing 67 when the latter is rocked into position, either manually or automatically, to aline the end portion of the sleeve with the hole. Engagement of the reduced end 62 of the sleeve 61 with the periphery of the hole 73 in the casing 67 acts to hold the same in a neutral position as illustrated in Fig. 4, at which juncture both of the worm-gears 54 and 55 are disengaged from the worm-wheel 53. By turning the crank-handle 60 the shaft 56 may be turned in either direction and operating through the sprocket 49 and chain section 46, it will operate to traverse the carriage 32. To disengage the sleeve 61 from the casing 67 it is only necessary to withdraw the sleeve toward the crank-handle 60 against the action of the spring 65 to disengage the pin 64 from the slot 63. The sleeve 61 may then be turned to engage its end with the projecting pin 64 to hold it withdrawn from the cover-plate 72 of the casing 67.

Although the traverse reversing mechanism has been described in connection with a lawn-mower reel R it will be understood that the reversing mechanism operates in the same manner to grind the stationary blades of a lawn-mower as illustrated and described in detail in the Carpenter patent, referred to above. To this end the stationary blade to be ground is mounted on the arms 18 of the cradle and the latter rocked on its supporting shaft 13 to engage the notches 25 in the arms 18 with the bolts 26 and the wing nuts 27 are screwed onto the bolts and tightened against the arms to position the blade below the grinding wheel. The carriage 32 and grinding wheel 30 mounted thereon then traverse the stationary blade in the manner as explained above.

In the machine as manufactured it has been found desirable to provide gear-teeth on the worm-wheel 53 and worm-gears 54 and 55 in the nature of screw threads having a V-shaped contour with a relatively large included angle of approximately 120°. Thus, the sides of the teeth have a relatively flat-slope pitch insuring easy engagement of the worm-gear 54 or 55 with the worm-wheel 53 and disengagement therefrom without clashing or burring of the gear-teeth. Preferably, the angular contour of the teeth of the gears 53, 54 and 55 and the eccentric pivot 71 for the casing 67 are so arranged that the tangential component of movement of any part of the teeth of the worm-gear 54 or 55 as it moves away from the worm-wheel 53 will not cause binding engagement between the sides of the gear-teeth. In other words, if the slope or pitch of the sides of the teeth of the gears 53, 54 and 55 were too steep or the eccentric axis 71 of the casing 67 too close to the axis of the driven shaft 56 the rocking movement of the casing would cause the sides of the teeth on the gear-wheel 54 or 55 to bear against the sides of the teeth on the worm-wheel as it moves away therefrom. It has also been found desirable to rotate the lawn-mower reel R in such manner as to cause the rear of its blades to first engage the grinding wheel as it rotates.

It will be observed from the foregoing description that the present invention provides automatic reversing mechanism for driving the traversing means which is of relatively simple and compact construction and adapted to be mounted on standard machines as an attachment. It will also be observed that a drive is provided for rotating the lawn-mower reel to be ground whereby to produce cylindrical ground surfaces. It will still further be observed that the driving and reversing mechanism for the traversing means and the drive for rotating the lawn-mower reel may be driven by a common driving motor.

While a preferred embodiment of the invention is herein described and illustrated it is to be understood that modifications may be made in the structure and arrangement of the parts of the machine without departing from the spirit or scope of the invention. For example, other forms of gears or friction rollers may be used instead of the worm-gears illustrated in the drawings. Therefore, without limiting ourselves in this respect, we claim:

In a machine of the type indicated, means for mounting a lawn-mower reel having a shaft, a drive shaft for rotating the lawn-mower reel, a dog having complementary jaws adapted to be clamped at one end to one of the shafts, a clamping bolt extending through the jaws, a threaded shank extending longitudinally of the jaws, a plug screwed onto the threaded shank and having pairs of stepped shoulders for engagement between the jaws at their ends, said plug being movable axially of the jaws by turning it on the threaded shank of the adjusting bolt to position one pair of shoulders between the jaws to adjust them to a diameter corresponding to the diameter of the shaft to which the dog is clamped, said dog having arms extending radially from the jaws, and a yoke-shaped driving head detachably mounted on the opposite shaft having arms extending parallel to the axis of the shaft and interengaging with the radial arms on the dog for operatively connecting the two shafts.

JOEL P. MAYNARD.
GEORGE A. MATTESON, Jr.